United States Patent [19]

Fujita et al.

[11] Patent Number: 4,965,615
[45] Date of Patent: Oct. 23, 1990

[54] VARIABLE FOCUS CAMERA

[75] Inventors: Masami Fujita; Kazuhiro Nakanishi; Yoshinobu Sameshima, all of Hachioji, Japan

[73] Assignee: Konica Corporation, Tokyo, Japan

[21] Appl. No.: 253,180

[22] Filed: Oct. 4, 1988

[30] Foreign Application Priority Data

Oct. 9, 1987 [JP] Japan ................................. 62-255642
Oct. 9, 1987 [JP] Japan ................................. 62-255643

[51] Int. Cl.$^5$ ........................ G03B 13/12; G03B 15/05
[52] U.S. Cl. ............................. 354/145.1; 354/195.12; 354/149.1; 354/149.11; 354/222
[58] Field of Search ............ 354/221, 222, 126, 145.1, 354/149.1, 149.11, 195.12

[56] References Cited

U.S. PATENT DOCUMENTS

| 2,945,419 | 7/1960 | Bechtold et al. | 354/221 |
| 2,995,061 | 8/1961 | Briskin et al. | 354/221 |
| 3,200,699 | 8/1965 | Graves | 354/222 |
| 3,798,668 | 3/1974 | Hartmann | 354/149.1 |
| 3,882,514 | 5/1975 | Graham | 354/149.1 |
| 4,195,924 | 4/1980 | Stemme et al. | 354/222 |
| 4,423,940 | 1/1984 | Kashihara et al. | 354/149.1 |
| 4,652,104 | 3/1987 | Harvey | 354/222 |
| 4,847,647 | 7/1989 | Ueda | 354/149.1 |

FOREIGN PATENT DOCUMENTS 61-138242  6/1986  Japan ................................. 354/149.1

Primary Examiner—A. A. Mathews
Attorney, Agent, or Firm—Finnegan, Henderson, Farabow, Garrett, and Dunner

[57] ABSTRACT

A variable focus camera includes a photographing lens constituted by at least two components, and changes the position of a magnification adjusting lens of a finder by a cam barrel of the photographing lens. In this camera, at least two magnification correction cams for extending the components of the photographing lens and having a focal-point correction function are formed on the cam barrel, and a magnification of the photographing lens is caused to coincide with a magnification of the finder by the magnification correction cams.

11 Claims, 7 Drawing Sheets

VARIABLE FOCUS CAMERA

BACKGROUND OF THE INVENTION

The present invention relates to a variable focus camera capable of varying a focal magnification according to a photographer's wish and, more particularly, to a variable focus camera having an external view finder constituted by an optical system separate from that of a photographing lens.

For example, when a variable focus camera such as a lens shutter camera (e.g., a zoom camera) having an external view finder constituted by an optical system separate from that of a photographing lens is to be designed, a field magnification of the finder must be interlocked with an extension amount of the photographing lens for changing a magnification. Since the lens arrangement of the photographing zoom lens is different from that of the finder, the extension amounts of these lenses for changing a magnification are different from each other. If a magnification adjusting lens (magnification variable element) is moved in proportion to the extension amount of the photographing lens, the size of an object to be actually photographed differs from a field of view observed through the finder.

For this reason, in a conventional camera, in order to compensate for a difference in magnification change rate due to a difference in arrangement of the photographing lens and the finder lens, a rotational motion of a cam barrel for extending the photographing lens is transmitted to the finder through a gear train or the like, so that a correction cam plate inside the finder is moved by the cam barrel at a predetermined rate. Thus, the moving rate of the magnification adjusting lens of the finder is corrected by a member driven by the correction cam plate.

FIG. 8 shows the relationship between displacements of the photographing lens and the finder magnification adjusting lens and a rotation angle of the cam barrel in a conventional camera. The lens displacement is plotted along the ordinate, and the rotation angle of the cam barrel is plotted along the abscissa. The left end of the abscissa corresponds to a wide-angle end, and the right end thereof corresponds to a telescopic end. The photographing lens consists of front and rear component lenses, which are respectively indicated by FC and RC in FIG. 8. The finder is indicated by FD. As can be seen from FIG. 8, the photographing lens and the magnification adjusting lens of the finder have different displacements with respect to the rotation angle of the cam barrel. Since the displacement of the finder is not linearly changed with respect to the rotation angle of the cam barrel, the displacement of the finder magnification adjusting lens with respect to the rotation angle of the cam barrel is compensated for using the above-mentioned cam mechanism.

However, in such a correction structure between the photographing lens and the finder, since the correction cam plate itself is very small, precise machining is required, and a correction error becomes very large. Therefore, the size of an object to be actually photographed is largely different from the size (framing) of a field of view observed through the finder.

Meanwhile, if an electronic flash is attached to the variable focus camera, the radiation angle of the electronic flash must be changed in accordance with the extension amount of the photographing lens. However, although the finder must be corrected with considerable precision, as described above, the electronic flash need only be adjusted roughly. In addition, the electronic flash requires a certain strength in an interlocking mechanism with the cam barrel.

In the conventional camera comprising the external view finder and the electronic flash, two interlocking mechanisms, i.e., the high-precision interlocking mechanism of the finder and the interlocking mechanism of the electronic flash, which does not require high precision but requires a predetermined strength, must be arranged. For this reason, the number of components is increased, and an assembly process is complicated, resulting in an increase in manufacturing cost. In addition, the camera may frequently malfunction.

SUMMARY OF THE INVENTION

It is a first object of the present invention to provide a structure which does not require strict machining precision and can eliminate a correction error in consideration of a problem of a correction mechanism between a photographing lens and a finder in a conventional variable focus camera described above.

In order to achieve the above object, according to the present invention, there is provided a variable focus camera which comprises a photographing lens constituted by at least two components, and changes a position of a magnification adjusting lens of a finder by a cam barrel of the photographing lens, wherein at least two magnification correction cams for extending the components of the photographing lens and having a focal-point correction function are formed on the cam barrel, and a magnification of the photographing lens is caused to coincide with a magnification of the finder b the magnification correction cams.

It is a second object of the present invention to provide a structure which can reduce the number of parts as much as possible to simplify an assembly process, and can eliminate frequency of troubles in consideration of a structural problem of a conventional variable focus camera comprising an external view finder and an electronic flash.

In order to achieve the above object, according to the present invention, there is provided a variable focus camera comprising an external view finder whose field angle is changed in accordance with an extension amount of a photographing lens and an electronic flash whose radiation angle is changed in accordance with the extension amount, wherein a rotation angle of a cam barrel in association with the extension amount of the photographing lens is converted to a linear movement of a driven member for moving a magnification adjusting lens of the finder, the electronic flash is arranged adjacent to the finder, and a radiation angle control member for controlling a radiation angle variable element of the electronic flash is interlocked with the driven member.

DETAILED DESCRIPTION OF THE PREFERRED EMBODIMENT

An embodiment of the present invention will be described hereinafter in detail with reference to the accompanying drawings.

Figure 1:
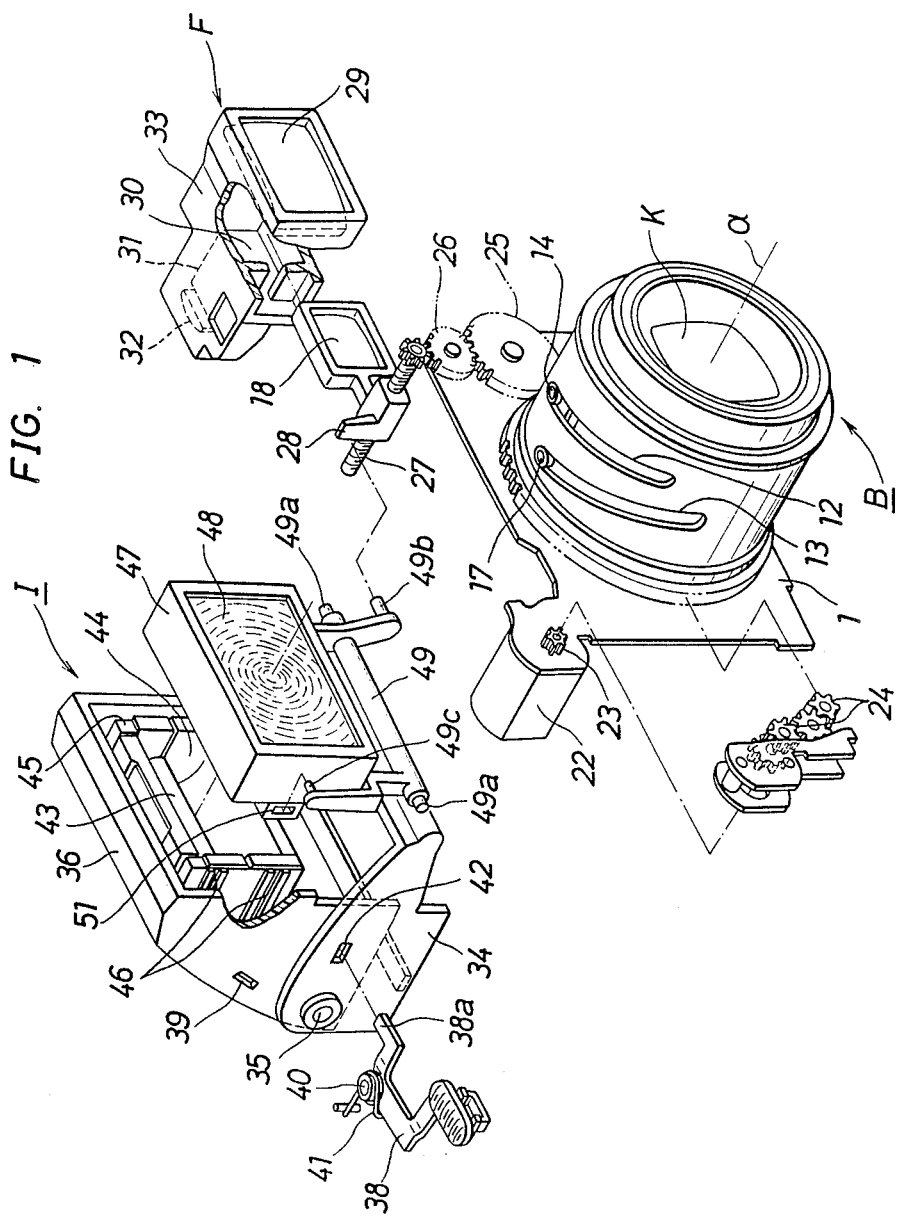
FIG. 1 is an enlarged exploded view of a main part of a variable focus camera according to the present invention.
Figure 2:
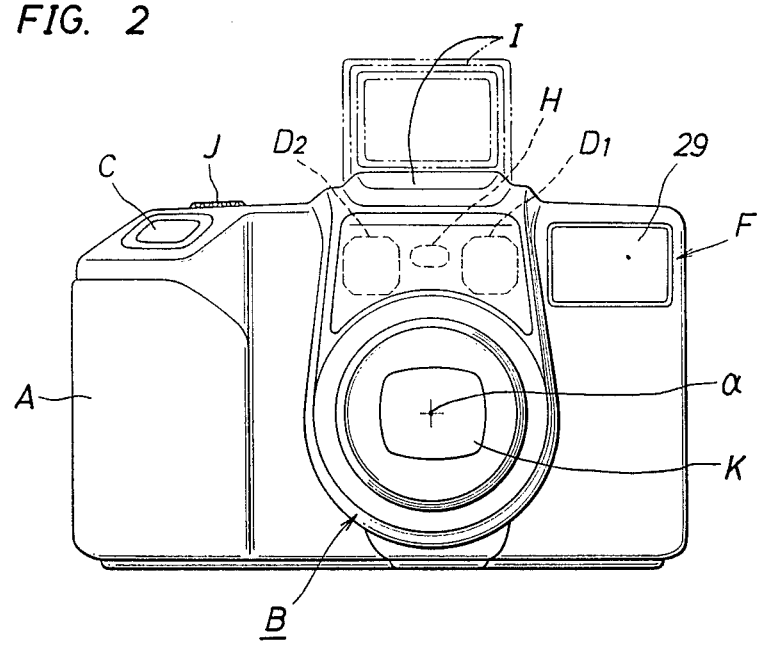
FIG. 2 is a front view of the variable focus camera shown in FIG. 1.
Figure 3:
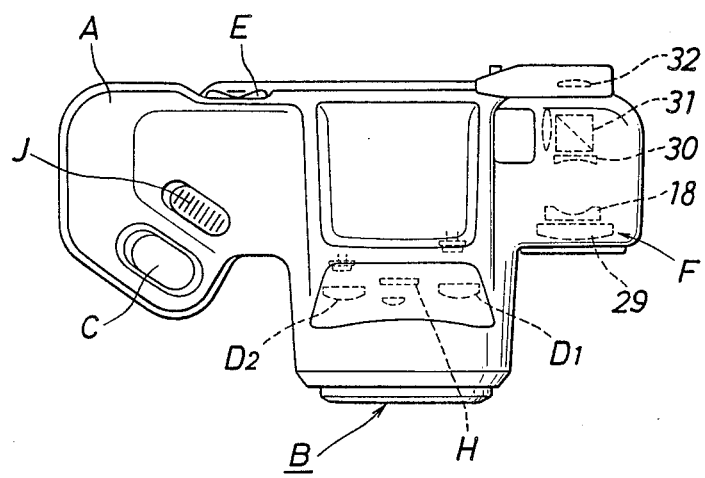
FIG. 3 is a top view of the variable focus camera shown in FIG. 1.

A variable focus camera (zoom camera) with an electronic flash to which the present invention is applied will be briefly described below with reference to FIGS. 1 and 2. The camera comprises a distance measuring unit for performing measurement of a distance to an object above a lens barrel B of a photographing lens arranged on the front surface of a camera body A. More specifically, the distance measuring unit as a known structure comprises a light-emitting module $D_1$ for radiating infrared light to an object upon depression of a release button C to a first stroke, and a light-receiving module $D_2$ for calculating a distance to an object based on a reflection angle of the infrared light. Based on the object distance calculated by the light-receiving module $D_2$, the position along a lens optical axis $\alpha$ of a front component lens $b_1$ (FIG. 4) constituting the photographing lens is adjusted. A magnification of an image to be photographed can be changed by manually operating a zoom button E on the rear surface of the camera body A. Upon operation of the zoom button E, the front component lens $b_1$ and a rear component lens $b_2$ (FIG. 4) constituting the photographing lens are moved along the lens optical axis $\alpha$. In this case, the size of an image to be photographed is observed through a light intake finder F on the upper portion of the camera body A. A lens shutter G (FIG. 4) of the lens barrel B of the photographing lens is operated upon depression of the release button C to the second stroke. An open time of the lens shutter G is determined by a photometry element H on the front surface of the camera body A. If a light amount of natural light incident on the photometry element H becomes short, a retractable electronic flash I, whose radiation angle is changed in accordance with the position of the photographing lens, and which is mounted on the upper portion of the camera body A emits light so as to compensate for an exposure light amount. A lock state of the retractable electronic flash I is released by manually operating a main button J on the shoulder surface of the camera body A, and the flash I stands upright, as indicated by an imaginary line in FIG. 2. When the electronic flash I stands upright, a spherical barrier member K (FIG. 4) on the front portion of the lens barrel B of the photographing lens is opened, and the camera is set in a standby state.

Figure 4:
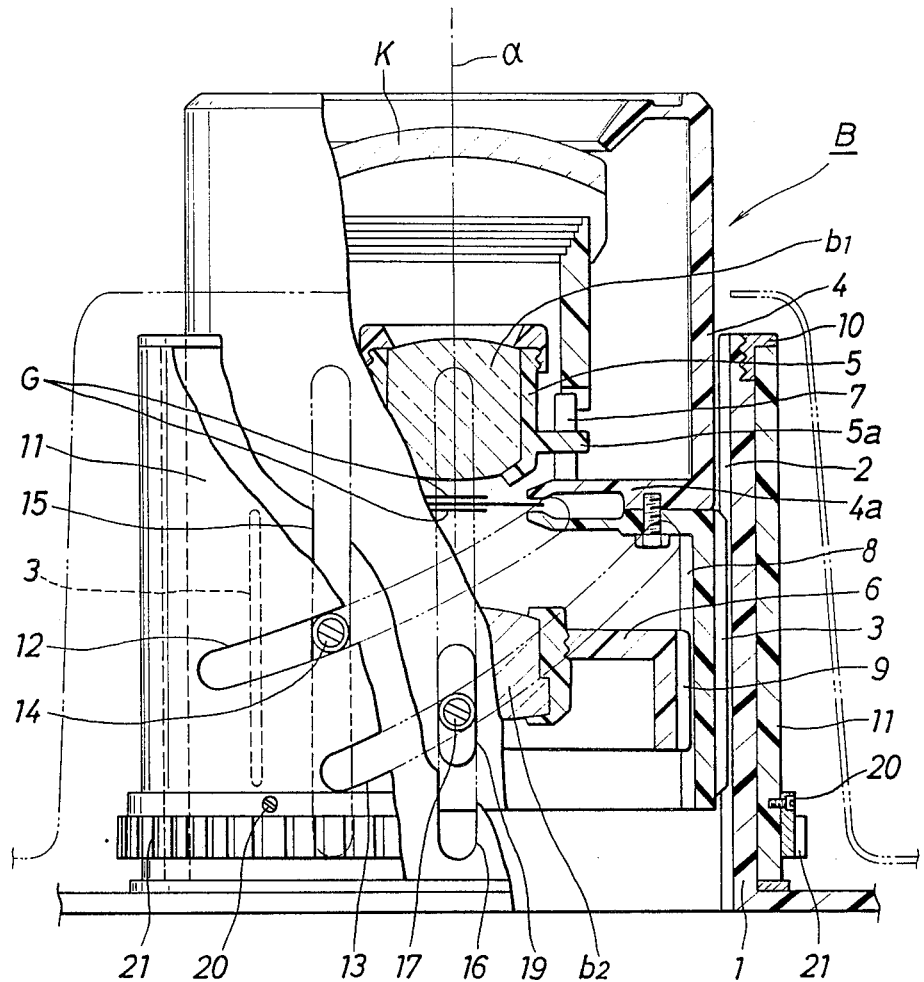
FIG. 4 is an enlarged top view of a lens barrel of a photographing lens of the variable focus camera shown in FIG. 1.

FIG. 4 is a partially cutaway, enlarged view of the lens barrel B of the photographing lens. The lens barrel B comprises a fixed lens barrel 1 fixed to the front surface of the camera body A. A plurality of slide grooves 2 extending along the lens optical axis $\alpha$ are formed in the inner surface of the fixed lens barrel 1. A movable lens barrel 4 is arranged inside the fixed lens barrel 1. Slide projections 3 movable along the slide grooves 2 in the direction of the lens optical axis $\alpha$ project from the outer surface of the movable lens barrel 4. The lens shutter G is mounted on a partition wall 4a partitioning the interior of the movable lens barrel 4. Front and rear holders 5 and 6 are assembled on the two sides of the partition wall 4a. More specifically, the front holder 5 for holding the front component lens $b_1$ has a driven projection 5a movable along a holder guide 7 formed in the partition wall 4a to be parallel to the lens optical axis $\alpha$. The front holder 5 is fed by a focusing means (not shown) along the lens optical axis $\alpha$ in response to an input signal from the light-receiving module $D_2$. A plurality of slide grooves 8 extending along the lens optical axis $\alpha$ are formed in the inner surface near the base portion of the movable lens barrel 4. Slide projections 9 projecting from the outer surface of the rear holder 6 for holding the rear component lens $b_2$ are guided along these slide grooves 8.

A cam barrel 11, which can be prevented from being removed by a holding ring 10 at the distal end portion of the fixed lens barrel 1 is mounted on the outer surface of the fixed lens barrel 1 to be rotational about the fixed lens barrel 1. A first correction cam groove 12 for extending the front holder 5 along the lens optical axis $\alpha$ and for correcting the extension amount in accordance with a change in magnification, and a second correction cam groove 13 for extending the rear holder 6 along the lens optical axis $\alpha$ and for correcting the extension amount in accordance with a change in magnification are formed in the peripheral wall of the cam barrel 11. More specifically, a driven pin 14 projects from the outer surface of the movable lens barrel 4 into the first correction cam groove 12 through a slot 15 formed in the peripheral wall of the fixed lens barrel 1 and parallel to the lens optical axis u so as to be movable along the lens optical axis $\alpha$ in accordance with rotation of the cam barrel 11. A driven pin 17 projects from the outer surface of the rear holder 6 into the second correction cam groove 13 through a slot 16 formed in the peripheral wall of the fixed lens barrel 1 and parallel to the lens optical axis $\alpha$ and an escape groove 19 of the movable lens barrel 4 in order to correct a difference in displacement of a magnification adjusting lens 18 (to be described later in detail) of the finder F and the movable lens barrel 4. Of course, the shapes of these first and second correction cam grooves 12 and 13 are determined to correct a magnification difference corresponding to displacements of the photographing lens and a lens group of the finder F which have different lens structures.

A ring gear 21 is fixed to the outer surface near the base portion of the cam barrel 11 by a mounting screw 20. A reduction gear train 24 driven by a driving pinion 23 of a zooming motor 22 fixed to one side of the fixed lens barrel 1 is meshed with the ring gear 21. Therefore, when the zoom button E is manually operated, the ring gear 21 and the cam barrel 11 are rotated toward the wide-angle or telescopic side in accordance with the operation direction of the zoom button E, and the movable lens barrel 4 is extended in the same direction. At the same time, the correction position of the rear component lens $b_2$ is automatically determined in accordance with the extension amount of the movable lens barrel 4.

In order to obtain zoom data corresponding to the rotation angle of the cam barrel 11, a driven gear 25 and a transmission gear 26 are mounted on the base portion of the fixed lens barrel 1 on a side opposite to the cam barrel 11. More specifically, the driven gear 25 meshed with the ring gear 21 rotates, through the transmission gear 26, a feed screw 27 extending along the lens optical axis $\alpha$. Since the feed screw 27 is threadably engaged with a driven member 28 for fixing the magnification adjusting lens 18 (to be described later), zoom data supplied from the ring gear 21 is converted to a displacement of the driven member 28 in a direction parallel to the lens optical axis $\alpha$.

The light intake finder F comprises an objective lens 29, the magnification adjusting lens 18, a correction lens 30, a half-mirror prism 31, and an eyepiece lens 32, which are aligned along a finder optical axis. The objective lens 29, the magnification adjusting lens 18, the correction lens 30, the half-mirror prism 31, and the eyepiece lens 32 are assembled in a finder box 33 shown in FIG. 1. The magnification adjusting lens 18 of the finder F is assembled in the finder box 33 to be movable along the finder optical axis, and its external end portion is fixed to the driven member 28.

Figure 5:
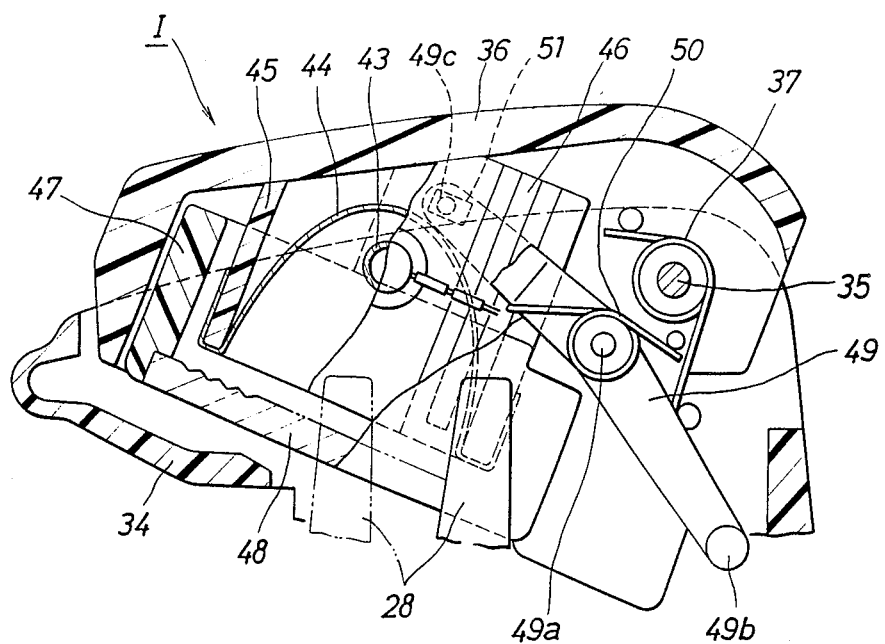
FIG. 5 is a sectional view of an electronic flash when it is retracted.
Figure 6:
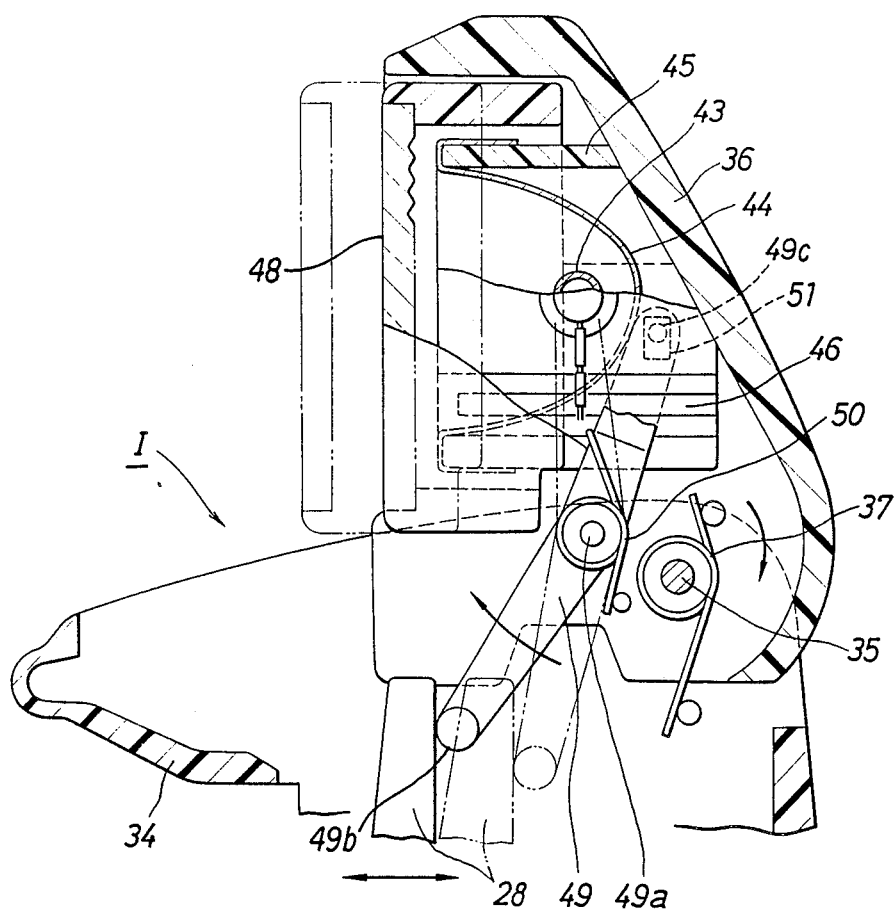
FIG. 6 is a sectional view of an electronic flash when it stands upright.

In FIGS. 5 and 6, the retractable electronic flash I mounted on the upper portion of the camera body A comprises a fixed frame 34 having an upper opening for receiving the driven member 28. An openable retractable cover 36 is mounted on the fixed frame 34 by a rear portion mounting shaft 35. The retractable cover 36 is biased in an opening direction (clockwise direction in FIG. 6) about the rear portion mounting shaft 35 by a tension spring 37 wound around the rear portion mounting shaft 35. A lock groove 39 to be engaged with a pawl 38a of a lock member 38 operated by the main button J is formed in the side surface of the cover 36. The lock member 38 shown in FIG. 1 is axially supported by a vertical shaft 40 at its middle portion, and is biased counterclockwise by a return spring 41 when viewed from the above of FIG. 1. The main button J is supported at one end of the lock member 38. The pawl 38a of the lock member 38 is inserted in a through hole 42 of the fixed frame 34 falling within a moving path range of the lock groove 39. If the retractable cover 36 is set in a retracted state illustrated in FIG. 5 against the biasing force of the tension spring 37, the pawl 38a of the lock member 38 is engaged with the lock groove 39, and the retractable cover 36 is locked at the position in FIG. 5.

A main body block 45 in which a xenon tube 43 serving as a light-emission source and a reflection mirror 44 for reflecting light from the xenon tube 43 in front of the camera are assembled is fixed inside the retractable cover 36. A plurality of parallel guide grooves 46 are formed in the side surface of the main body block 45. A Fresnel lens frame 47 fitted on the main body block 45 is guided and supported by these guide grooves 46. The surface of the Fresnel lens frame 47 is covered with a radiation angle adjusting member, i.e., a Fresnel lens 48 for radiating light reflected by the reflection mirror 44 toward an object.

A radiation angle control member 49 for adjusting the Fresnel lens frame 47 and the Fresnel lens 48 according to the position of the driven member 28 is arranged below the main body block 45. A pivot pin 49a at the middle portion of the radiation angle control member 49 is pivotally supported on the side wall of the retractable cover 36. The radiation angle control member 49 is biased clockwise in FIG. 6 about the pivot pin 49a by a biasing spring 50 bridged between the pin and the side wall. In order to obtain a position of the Fresnel lens 48 according to the position of the driven member 28, i.e., the zoom data, the driven pin 49b of the radiation angle control member 49 faces the moving path range of the driven member 28, and an engaging pin 49c at the opposite side to the driven pin 49b is inserted in an engaging hole 51 formed in the rear portion of the Fresnel lens frame 47.

Since the variable focus camera with the electronic flash according to the illustrated embodiment has the structure described above, the feed screw 27 and the driven member 28 are assembled in advance in the finder box 33, and after the finder F is assembled to the camera body A, the separately assembled electronic flash I need only be fixed to the camera body A. Thus, the interlocking relationship between the lens barrel B of the photographing lens, the finder F, and the electronic flash I can be obtained.

In the variable focus camera according to the illustrated embodiment, a photographer can desirably select the size of an object to be photographed, i.e., a field of view to be photographed in accordance with the operation direction of the zoom button E. More specifically, when the zoom button E is manually operated, the zooming motor 22 is rotated in the forward or reverse direction in accordance with the operation direction of the button E. Thus, the ring gear 21 and the cam barrel 11 are rotated about the lens optical axis $\alpha$ by the driving pinion 23 of the zooming motor 22. Therefore, upon rotation of the cam barrel 11, since the driven pin 14 engaged with the first correction cam groove 12 is moved along the slot 15 in a direction parallel to the lens optical axis $\alpha$, the photographing lens supported by the movable lens barrel 4 integral with the driven pin 14, i.e., the front and rear component lenses $b_1$ and $b_2$ are moved forward or backward along the lens optical axis $\alpha$. Thus, the size of an object to be photographed on a film is changed.

The rotation of the ring gear 21 upon manual operation of the zoom button E, i.e., the zoom data of the photographing lens is transmitted to the magnification adjusting lens 18 of the finder F through the driven gear 25, the transmission gear 26, the feed screw 27, and the driven member 28 to change the field magnification of the finder F. In this case, a difference between the field magnification upon movement of the magnification adjusting lens 18 and the magnification upon movement of the photographing lens along the lens optical axis $\alpha$ is corrected as follows. More specifically, since the camera barrel 11 is rotated simultaneously with the rotation of the ring gear 21, the driven pin 17 engaged with the second correction cam groove 13 of the cam barrel 11 is moved in a direction parallel to the lens optical axis $\alpha$ upon rotation of the cam barrel 11. More specifically, the movement of the driven pin 17 is a movement relative to the movable lens barrel 4 along the slot 16 of the fixed lens barrel 1. The rear holder 6 is slightly moved along the lens optical axis $\alpha$ relative to the movable lens barrel 4, thus correcting a magnification difference.

Figure 7:
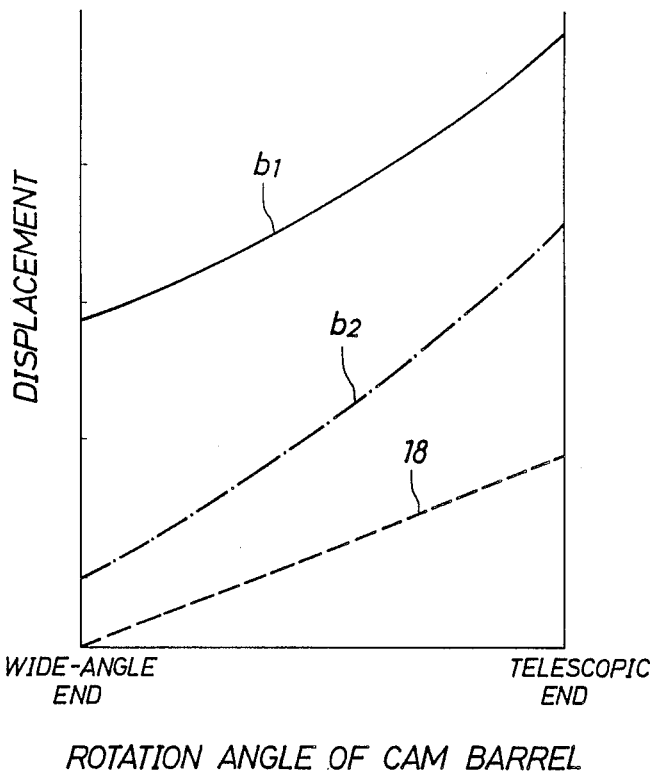
FIG. 7 is a graph showing the relationship between displacements of a photographing lens and a finder magnification adjusting lens and a rotation angle of a cam barrel in an embodiment of the variable focus camera according to the present invention.
Figure 8:
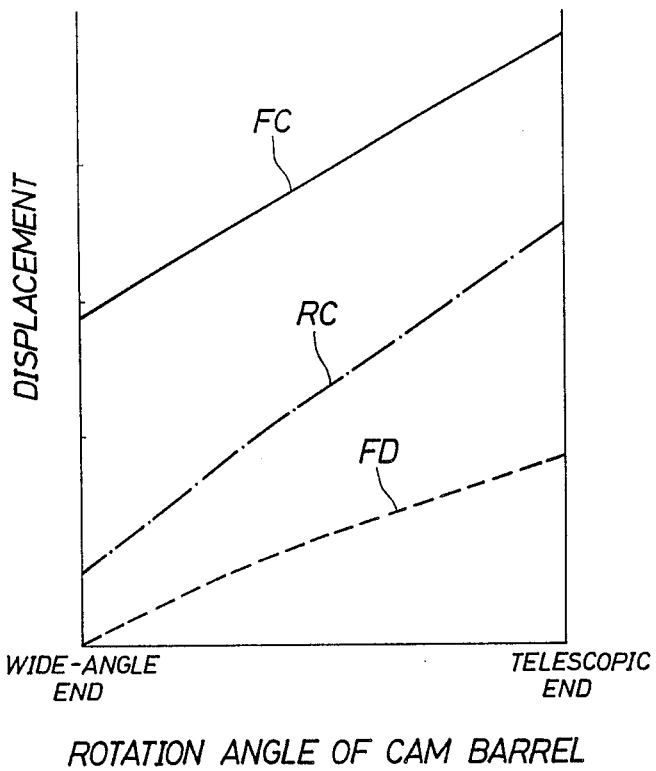
FIG. 8 is a graph showing the relationship between displacements of a photographing lens and a finder magnification adjusting lens and a rotation angle of a cam barrel in a conventional camera.

FIG. 7 shows displacements of the front component lens $b_1$, the rear component lens $b_2$, and the magnification adjusting lens 18 with respect to the rotation angle of the cam barrel 11. As can be seen from FIG. 7, the magnification adjusting lens 18 is linearly displaced upon rotation of the cam barrel 11. Therefore, a magnification difference between the photographing lens and the finder can be corrected without providing a correction cam requiring high machining precision to the finder.

Simultaneously with the operation in the finder F, the forward/backward displacement of the driven member 28 is transmitted to the Fresnel lens frame 47 through the radiation angle control member 49, thus determining a radiation angle of the electronic flash I according to the magnification of the photographing lens. In the retracted state of the electronic flash I shown in FIG. 5, the Fresnel lens frame 47 is kept retracted by the biasing force of the biasing spring 50. When the main button J is manually operated, the pawl 38a of the lock member 38 is disengaged from the lock groove 39 of the retractable cover 36, and the electronic flash I stands upright to the state illustrated in FIG. 6 by the force of the tension spring 37. The driven pin 49b of the radiation angle control member 49 abuts against the driven member 28. Therefore, when the driven member 28 is moved upon manual operation of the zoom button E, the driven pin 49b of the radiation angle control member 49 follows this movement, and the radiation angle control member 49 is pivoted about the pivot shaft. As a result, the Fresnel lens 48 is moved to the position corresponding to the displacement of the driven member 28, and the radiation angle of the electronic flash I corresponding to the magnification of the photographing lens can be obtained. When the retractable cover 36 is manually operated to the position shown in FIG. 5 against the biasing force of the tension spring 37, the cover 36 is locked at the retracted position. In this case, the Fresnel lens 48 and the Fresnel lens frame 47 are automatically housed in the retracted cover 36 by the biasing spring 50. The lens barrel B of the photographing lens is returned to its initial position in response to a signal from a switch for detecting the retracted state of the retractable cover 36, thus closing the barrier member K.

As can be seen from the above description, according to the present invention, the magnification adjusting lens of the finder is moved in proportion to the rotation angle of the cam barrel associated with the extension amount of the photographing lens, and the correction cams are formed in the cam barrel to correct the position of the magnification variable element, i.e., rear component lens of the photographing lens. Therefore, the correction cams can be relatively large, and do not require strict machining precision, thus allowing inexpensive manufacture. Even if the correction cams or the corresponding driven pins include machining errors or assembly errors, these errors do not cause an influence as correction errors. Therefore, a difference between the size of an object on a photographing film and framing in the finder can be reduced.

Furthermore, according to the present invention, since the driven member for moving the magnification adjusting lens of the finder is interlocked with the radiation angle control member for controlling the radiation angle variable element of the electronic flash, the number of components can be reduced, and the assembly process can be simplified, thus obtaining a trouble-free structure.

In the above embodiment, the light intake finder has been exemplified. However, the finder of this invention can be an external view finder and may be a direct-view finder, a real-image finder, an Albada finder, or the like. In the above embodiment, the radiation angle of the electronic flash is changed by changing the position of a projection lens (Fresnel lens 48) of the electronic flash. However, the position of the light-emission tube of the electronic flash can be changed to vary the radiation angle.

We claim:

1. A variable focus camera comprising: a photographing lens including at least two components, a finder including means for changing a position of a magnification adjusting lens of the finder in response to rotation of a cam barrel of said photographing lens, said cam barrel including at least two magnification correction cams for extending the components of said photographing lens and having a focal-point correction function, a magnification of said photographing lens is caused to coincide with a magnification of said finder by said magnification correction cams, a driven member for converting rotation of said cam barrel into linear movement to move said magnification adjusting lens of said finder, and wherein said magnification correction cams are formed so that said driven member is linearly displaced upon rotation of said cam barrel.

2. A camera according to claim 1, further comprising an electronic flash and a radiation angle control member for controlling a radiation angle variable element of said electronic flash, and wherein said radiation angle control member is interlocked with said driven member.

3. A camera according to claim 2, wherein said electronic flash is of a retractable type.

4. A camera according to claim 1, wherein said photographing lens comprises a zoom lens.

5. A camera according to claim 1, wherein said photographing lens can be varied at a plurality of focal points.

6. A variable focus camera comprising an external view finder whose field angle is changed in accordance with an extension amount of a photographing lens and an electronic flash whose radiation angle is changed in accordance with the extension amount, wherein a rotation angle of a cam barrel in association with the extension amount of said photographing lens is converted to linear movement of a driven member for moving a magnification adjusting lens of said finder, said electronic flash is arranged adjacent to said finder, and a radiation angle control member for controlling a radiation angle variable element of said electronic flash is interlocked with said driven member.

7. A camera according to claim 6, wherein said cam barrel is arranged on an outer surface of a lens barrel, a cam groove is formed in a peripheral wall of said cam barrel, a pin coupled to said photographing lens is inserted in said cam groove, and said cam barrel is rotated to extend said photographing lens along an optical axis.

8. A camera according to claim 6, wherein a ring gear is formed on an outer surface of said cam barrel, rotation of said ring gear is transmitted to a feed screw through a gear train, a driven member for moving said magnification adjusting lens is attached to said feed screw, and said driven member is moved in an optical axis direction of a finder optical system upon rotation of said feed screw.

9. A camera according to claim 6, wherein said radiation angle control member controls a position of a projection lens of said electronic flash.

10. A camera according to claim 6 wherein said radiation angle control member controls a position of a light-emission tube of said electronic flash.

11. A camera according to claim 6 wherein said electronic flash is of a retractable type.

* * * * *